Nov. 22, 1927.
W. FROST
1,650,504
APPARATUS FOR TESTING MOTOR VEHICLES
Filed Nov. 11, 1926    2 Sheets-Sheet 1
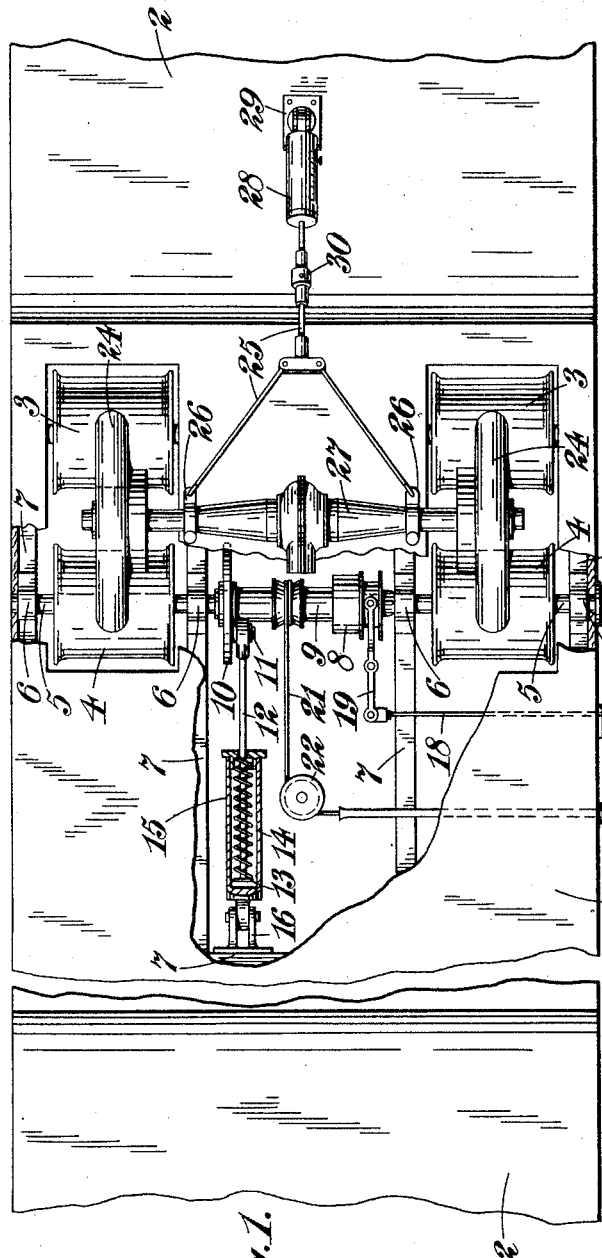
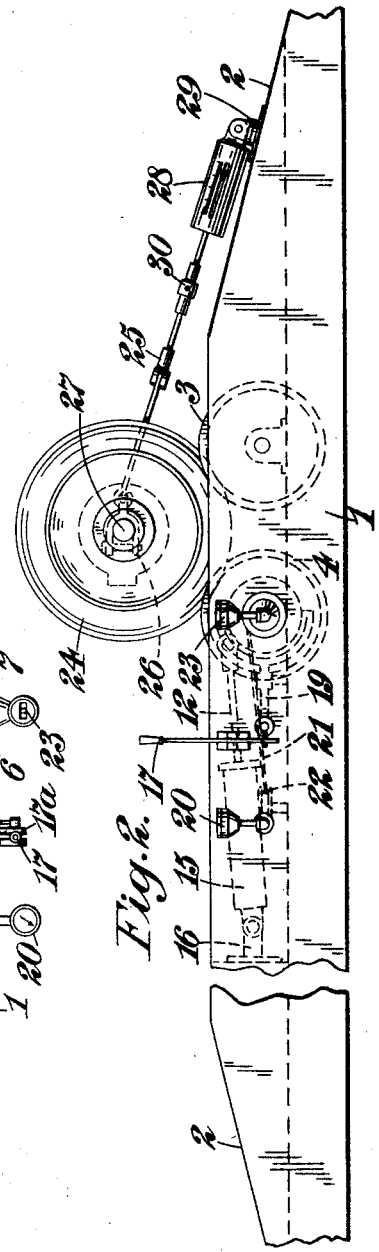
Inventor
William Frost
by Wilkinson & Gusta
Attorneys.

Patented Nov. 22, 1927.

1,650,504

UNITED STATES PATENT OFFICE.

WILLIAM FROST, OF LONDON, ENGLAND.

APPARATUS FOR TESTING MOTOR VEHICLES.

Application filed November 11, 1926, Serial No. 147,780, and in Great Britain May 12, 1926.

This invention has for its object to provide a novel apparatus which will simplify and facilitate the testing of motor vehicles and/or their equipment; heretofore, the testing of a motor road vehicle has been effected by dealing with individual components, such as a brake test for the engine, or if it were specially desired to test the complete vehicle, this was done either by running it on the public roads or on a special track. Both of these latter methods having their disadvantages, particularly in that no definite numerical value can be assigned to the "running capabilities" of the vehicle. Moreover in the case of road tests, many conditions are variable and uncontrollable, whilst if a special track is provided for tests, it is expensive, and the space for it is not always available where it is required. The object of this invention is to provide an apparatus for testing motor road vehicles which, whilst providing all the conditions necessary for a complete test of the vehicle, is so simple and inexpensive that it can be installed in any garge or workshop, and so ensure the best service to the owner of the vehicle by enabling very complete tests of the complete vehicle to be carried out in a simple and inexpensive manner.

I am aware that it has been proposed to test locomotives for railways in a manner analogous to the present invention, but the apparatus involved in such tests is elaborate and expensive, and is such that a special building is required to accommodate it. For the purposes of the present invention, the apparatus must be simple, comparatively small and inexpensive, in order that it shall be available for general use wherever motor vehicles may be repaired or overhauled.

According to the present invention, apparatus for testing motor road vehicles and/or their equipment comprises a movable track-member or members adapted to be engaged and driven by the driving-wheels of the vehicle, means for applying a measured braking force to oppose the movement of the track-member or members, and means for measuring the rate of movement of the track-member or members.

Thus a motor road vehicle may be mounted upon the track member or members and while it is itself stationary, all parts of its mechanism, including its driving road wheels, are capable of their normal operating movement against forces which simulate the normal resistance to the movement of the vehicle.

In a preferred form of the invention, the track-member or members are adapted to receive the driving-wheels of any motor vehicle which it may be required to test, irrespective of the width of the track of such wheels.

It is desirable with an apparatus as above set forth that means should be provided to restrain the vehicle from moving off the track-member or members whilst in operation, as the result of some irregularity of working, or mishap, and according to another feature of this invention, such restraining means, which conveniently is a tie-member, is provided with means for measuring the force exerted by it.

Any desired means may be used for applying a braking force to the track-members; by arranging that the track-member drives or is constituted by a rotating member, a mechanical brake, when ordinary brake-shoes may be used, or it may take the form of a friction clutch whereof one member is held stationary, a convenient construction being a multiple-plate clutch. Alternatively, the braking force may be obtained by absorbing power from the track-member by driving a fan, either accumulating compressed air in a reservoir or controlling the output of the fan to vary the loading. This particular braking arrangement may be usefully employed where a special supply of air is necessary for cooling the engine.

Alternatively, a hydraulic brake or an electric brake may be used; these are more convenient where greater amounts of power have to be absorbed, since it can be more easily dissipated as heat. In the case of electric braking in which the track-member is used to drive a generator, it is also possible to use the generator as a motor so as to impart a drive to the road wheels of the car, such an arrangement being useful for special investigations as to the losses arising in the vehicle itself.

In a preferred form of the invention, the apparatus is completely self-contained, and in fact may be portable, the construction being such that it is simply laid on the ground and the vehicle to be tested can be run on to it to carry out the tests; this is advantageous in that no special preparation or construction such as making pits, or other building operations, are necessary in installing the apparatus.

The invention will be more clearly understood from the following description of one specific embodiment thereof with reference to the accompanying drawings in which:—

Figure 1 is a plan view partly broken away and partly in section diagrammatically representing a motor vehicle testing apparatus according to this invention and showing the rear axle and driving wheels of a motor vehicle resting thereon;

Figure 2 is a side view thereof; and

Figure 3:
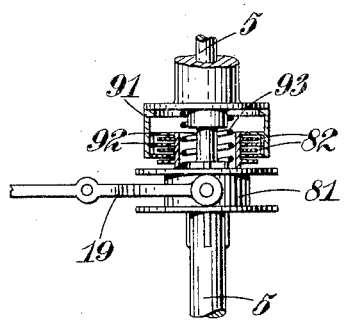
Figure 3 is a detail view.

Referring to the drawings, a platform 1, adapted to rest on the ground and of suitable strength to sustain the weight of a motor vehicle and the force to be absorbed has at each end a ramp 2 provided to enable a vehicle to be run on to the platform. Arranged substantially below the upper surface of the platform and at each side there are two rollers 3 and 4 spaced apart and adapted to receive a driving wheel 24 of a motor vehicle resting upon both of them. The rollers 3 and 4 are preferably longer than the normal width of a road wheel of a motor vehicle in order that vehicles of different track width may be accommodated thereon and carried by shafts which are preferably mounted on ball bearings so as to reduce unknown friction losses to a minimum. The rollers 3 are freely rotatable and the rollers 4 are mounted upon a shaft 5 carried in bearings 6 which are supported by frame members 7 of the platform 1.

On the shaft 5 there is loosely mounted a sleeve 9 and this sleeve is adapted to be coupled to the shaft 5 by means of a multiple-plate clutch 8. As indicated in Figure 3 the clutch 8 comprises an operating sleeve 81 which is splined on the shaft 5 and which carries one set of plates 82 of the clutch. The sleeve 9 has an enlarged extension 91 which carries the other set of plates 92 of the clutch and a helical spring 93 serves normally to separate the plates 82 from the plates 92. The sleeve 9 which is capable of only limited rotation supports a crank-disc 10 having a crank-pin 11 to which is connected one end of a connecting rod 12. The other end of the connecting rod has an abutment 13 for a suitably stout compression spring 14 mounted on the connecting rod and carried in a casing 15 which is pivotally connected to a bracket 16 carried by a frame member 7.

The clutch 8 is operated by a lever 17 through the medium of a rod 18 and a pivoted lever 19 which engages the operating sleeve 81 to press the plates 82 and 92 of the clutch together, said lever 17 co-operating with a rack 17ª in order that a variable braking effect may be obtained. The extent to which the spring 14 is compressed and consequently the amount of rotation of the sleeve 9 is indicated on a suitably calibrated scale in an instrument 20 by means of a wire 21, passing round a pulley 22, one end of the wire being wound about the sleeve 9 and the other end being connected with the needle of the instrument 20. An instrument 23 is coupled to the end of the shaft 5 and includes a revolution counter which may be calibrated in any suitable units such as revolutions, or miles or meters measured on the periphery of the rollers 4. The instrument 23 also includes a speed indicator which may be calibrated in any convenient units such as revolutions or feet per second, or miles per hour according to the requirements of any particular case.

In use of the apparatus a motor vehicle is run on to the platform 1 and is caused to take up a position with one driving wheel 24 resting upon each pair of rollers 3 and 4. The driving wheels are then driven by the engine of the vehicle and the clutch 8 is engaged to a desired degree by the lever 17, thereby causing the sleeve to partially rotate against the action of the compression spring 14. Readings of the instruments may then be taken and if desired the degree to which the clutch 8 is engaged may be altered by adjusting the position of the handle 17 and another set of readings taken. These readings may be utilized for example for comparison with similar readings taken after the automobile has undergone overhaul or with readings taken during the test of another vehicle.

It may be necessary to provide means for preventing the driving wheels moving off the rollers 3 and 4 when a vehicle is under test and for this purpose a tie member 25 may be employed. The tie member is provided with shackles 26 for connection to the axle 27 of the vehicle and operates against a compression spring located in a casing 28 pivotally connected to a bracket 29 fixed to the casing 1. A turn-buckle 30 may be provided to facilitate adjustment of the tie member.

Although only one manner of carrying out the invention has been described in detail it is to be understood that the invention may be embodied in a variety of modified forms.

A very simple form of apparatus according to the invention comprising only means for measuring the braking load, and the speed of rotation of the track-member, is very useful for making comparative tests on a vehicle in such circumstances as before and after it is overhauled; it is only necessary to take a reading of the engine output under definite conditions of throttle opening before the overhaul and to repeat the test under the same conditions after the overhaul, when there should be an increase in power. The apparatus, however, is also suitable for carrying out any tests on vehicles such as, for example, with different fuels, different carburettor settings, different lubricating oil, different modes of ignition and any other variables. It is also useful in comparing any vehicle with other vehicles of the same make to ascertain whether it is working less satisfactorily than can reasonably be expected. The apparatus is also suitable for testing such accessories as, say, the speedometer, when the latter is driven from some part of the transmission system, since its readings, both as to distance and speed, can be compared with those of the apparatus.

It will be seen, therefore, that this invention provides an apparatus for testing motor vehicles which enables all the tests normally effected by running on a road or track to be even more satisfactorily carried out. Moreover, these comparative tests are such as give a numerical value to the capability of the car for travelling, which is the principal factor with which the users are concerned.

I claim:—

1. A self-contained motor vehicle testing apparatus comprising a base platform, pairs of track rollers respectively near opposite edges of the platform for accommodating the driving wheels of a motor vehicle, one track roller of each pair being freely rotatable and the other track rollers being mounted on a common shaft supported in bearings carried by the base platform, a sleeve rotatably mounted on said shaft, a friction member mounted on said shaft and a co-operating friction member mounted on said sleeve, means for resisting turning movement of said sleeve, means for variably engaging said friction members, means for indicating the amount of turning movement of said sleeve and means for measuring the speed of rotation of the track rollers.

2. A self-contained motor vehicle testing apparatus comprising a base platform, pairs of track rollers respectively near opposite edges of the platform for accommodating the driving wheels of a motor vehicle, a track roller of each pair being freely rotatable and the other track rollers being mounted on a common shaft supported in bearings carried by the framework of the base platform, a sleeve loose on said shaft, a friction clutch, one element of which is carried by the said shaft and the other element thereof is carried by said sleeve, spring means for resisting turning movement of said sleeve, means for operating said clutch, means for indicating the amount of turning movement of the said sleeve and means for measuring the speed of rotation of the said track rollers mounted on a common shaft.

In testimony whereof I affix my signature.

WILLIAM FROST.